US006628632B1

United States Patent
Dolan (12) United States Patent
(10) Patent No.: US 6,628,632 B1
(45) Date of Patent: Sep. 30, 2003

(54) METHOD AND APPARATUS FOR PERMITTING DIRECT HANDOFF BETWEEN BASE STATIONS IN A WIRELESS NETWORK

(75) Inventor: Michael F. Dolan, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/356,510

(22) Filed: Jul. 19, 1999

(51) Int. Cl.$^7$ .............. H04Q 7/00; H04Q 7/20; H04B 1/38
(52) U.S. Cl. ............. 370/332; 455/433; 455/561; 455/437
(58) Field of Search ............... 455/438, 561, 455/560, 439, 437, 442, 436; 370/332, 331

(56) References Cited

U.S. PATENT DOCUMENTS

| | | | | |
|---|---|---|---|---|
| 5,189,734 A | | 2/1993 | Bailey et al. ............... 455/438 |
| 5,305,308 A | | 4/1994 | English et al. .............. 370/335 |
| 5,327,575 A | | 7/1994 | Menich et al. .............. 455/437 |
| 5,418,838 A | * | 5/1995 | Havermans et al. ......... 455/436 |
| 5,432,843 A | | 7/1995 | Bonta ........................ 455/438 |
| 5,499,387 A | * | 3/1996 | Chambert ................... 455/437 |
| 5,509,051 A | * | 4/1996 | Barnett et al. ............... 455/560 |
| 5,608,780 A | * | 3/1997 | Gerszberg et al. ........... 455/436 |
| 5,724,665 A | * | 3/1998 | Abbasi et al. ............... 455/561 |
| 5,794,149 A | | 8/1998 | Hoo ........................... 455/438 |
| 5,953,668 A | * | 9/1999 | Reilly ........................ 455/438 |
| 6,108,547 A | * | 8/2000 | Yamashita et al. .......... 455/442 |
| 6,131,030 A | * | 10/2000 | Schön et al. ................ 455/438 |
| 6,201,969 B1 | * | 3/2001 | Meier ......................... 370/331 |

FOREIGN PATENT DOCUMENTS

| | | | |
|---|---|---|---|
| GB | 2 319 439 | 5/1998 | ............ H04Q/7/22 |
| WO | 00/11878 | 3/2000 | |

OTHER PUBLICATIONS

European Search Report, Oct. 25, 2001.

* cited by examiner

Primary Examiner—William Trost
Assistant Examiner—Rafael Perez-Gutierrez (57) ABSTRACT

A handoff method and apparatus are disclosed for use in a wireless communication network in which a primary base station servicing a call directly selects a handoff candidate base station based in part on provided base station identity and address information. The base station is operable to directly establish a connection with a handoff candidate, selected from the one or more neighbor base stations, or neighbors of its neighbors, and handoff the call, based on one or more signal quality measurements and base station identity and address information.

38 Claims, 6 Drawing Sheets

METHOD AND APPARATUS FOR PERMITTING DIRECT HANDOFF BETWEEN BASE STATIONS IN A WIRELESS NETWORK

BACKGROUND OF THE INVENTION

1. Field of the Invention

The invention generally relates to wireless signal call handling and specifically the handling of wireless calls among base stations (BS).

2. Description of the Related Art

Wireless communication networks are currently experiencing wide popularity in the form of cellular communication systems. Wireless communication networks typically comprise a plurality of base stations that connect wireless subscribers to other communication system users. A base station services a wireless subscriber by providing a communication link over a radio channel for a call, such as, for example, a telephone call. The base station then communicates information and/or voice signals associated with the call, or call signals, to further networks, which may include the public switched telephone network (PSTN). In general, such systems include a central control processor ("CCP") that is connected to and coordinates the operations of the plurality of base stations. In cellular systems, the CCP is sometimes referred to as the executive cellular processor.

Ordinarily, a particular base station can only service a wireless subscriber who is located in close enough proximity to have sufficient radio signal strength to sustain the call. Accordingly, wireless networks employ several base stations which are situated in different geographical areas such that a user is typically within close enough proximity to at least one of the base stations. Cellular systems, for example, operate in this manner. One of the primary features of a cellular system is the ability to provide uninterrupted service to a call while the subscriber is actively moving in and out of the vicinity of several base stations. In such systems, when the subscriber moves to a location in which the radio signal strength weakens or otherwise deteriorates, the system causes another more suitably located base station to service the call. The system effects the base station change using a procedure referred to as a handoff procedure.

Because wireless communication systems are currently experiencing substantial popularity, the number of users is increasing. The growing user population can create congestion of the frequency spectrum presently allocated for wireless communications. As a result there has been a need to utilize the available frequency spectrum in a more efficient manner. There are several methods by which wireless systems exploit the limited available frequency spectrum in order to maximize the call traffic capacity. These methods feature call signal modulation techniques, including time division multiple access (TDMA) and code division multiple access (CDMA) modulation techniques. Of these, the use of CDMA provides several advantages over the other techniques because it allows the frequency bands within the spectrum to be reused by several subscribers simultaneously. This frequency reuse further increases system capacity.

Another advantage of the frequency reuse capabilities of CDMA wireless systems is that it enables the use of a soft handoff procedure. A soft handoff is a procedure in which a second base station is added to service a call while the original base station continues to service the call. In such cases, both base stations communicate concurrently with the subscriber. Upstream network connections may then utilize signals from the base station having the better connection to the subscriber. For example, consider a call that is serviced by a first base station. Ordinarily, the first base station communicates with the subscriber and forwards the subscriber's call signals to and from an upstream telephone network. If a soft handoff is executed and a second base station is added to service the call, both the first and second base stations would then communicate with the subscriber. Furthermore, the upstream network connection would then select signals from either the first or second base station to forward to the upstream network. Typically, the better of the two signals is forwarded.

In systems using base station controlled handoffs, a base station servicing the call, often called the primary base station, is responsible for making handoff decisions. Base station controlled handoffs not only reduce the computational load on the system's CCP, but also reduce delay in the handoff procedure by reducing communications between the base station and the CCP. Such systems have been described in, for example, M. J. English, et al. U.S. Pat. No. 5,305,308 that issued Apr. 19, 1994, at column 36, line 1 to column 37, line 6.

During normal wireless call handling, in a wireless network using CDMA soft handoff techniques, it is standard for base stations to send back to the controlling base station, a list of radio resources (cells) that are near each of the cells that currently provide radio contact with the mobile station. In other words, base stations typically send "neighbor lists", so that a base station not only includes information of its neighboring base stations, but also of base stations neighboring its neighboring base stations.

With the increased use of data applications, call holding times increase and the possibility exists that a mobile station (MS) will move beyond the geographical area known to the BS that is controlling the call. In this case, the controlling BS must request radio resources to complete a soft handoff to a neighboring base station. But as the mobile station in a call with a long holding time continues to move beyond the range of even its neighboring base stations, the controlling BS must request radio resources from other BSs that it may not normally communicate with, such as neighbors of its neighbors, and for which it does not know the correct signaling address. Use of the main switching station and slow signal handoff between base stations could cause a call to be dropped. Accordingly, a need exists for controlling base stations to communicate directly with neighboring base stations and to have access to information for communicating with neighbors of its base station neighbors.

The controlling base stations, in order to support the longer holding times of calls, must be able to access the resources of the neighbors of its neighbors, and even their neighbors as the mobile station moves farther and farther away from the point where the call began. These neighbors of neighbors, and neighbors of neighbors of neighbors can be referred to as second order neighbors, third order neighbors, etc. The controlling base station, in order to access resources of its immediate, or first order neighbors, must be able to communicate with those neighbors to request those resources. Thus, a need exists for enabling controlling base stations to communicate directly with other base stations.

SUMMARY OF THE INVENTION

The present invention provides a method and apparatus for base station control signal handoff, permitting base stations to communicate directly with each other. Signaling addresses and identities of further neighbor base stations are provided so that, in effect, a base station is able to communicate directly with neighbors of its neighboring base stations. In this way, the wireless network automatically includes base station identity and address information, thus allowing the controlling base station to communicate directly with any base station necessary to continue support of a call, without the need to communicate through the mobile switching center, and with minimal human intervention.

DETAILED DESCRIPTION

Signaling addresses of $n^{th}$ order neighbor base (second order, third order, etc.) stations are not normally known to the controlling base station. To provision such addresses into each such controlling base station would require not only knowledge of all such addresses, but also continued maintenance of such addresses and thus would be impractical. This problem is compounded when some of the $n^{th}$ order neighboring base stations may belong to a network operated by a different service provider. Dynamic changes in the configurations of such networks would require constant maintenance that would be subject to human error if done manually. Thus, there must be some dynamic means of providing such signaling addresses without human intervention at all possible $n^{th}$ order neighboring base stations. By sending neighbor listings to the controlling base station, including identities and addresses of neighbors of neighbors, and addresses of neighbor of neighbors of neighbors, such a problem is solved by the present invention.

Thus, the same signaling that is used with first order neighbors is used with second order, third order, etc., neighbors since the controlling base station knows their signaling addresses and has some signaling connectivity to them. As the mobile station moves farther and farther away from the controlling base station, the radio resources necessary to support soft handoff of the call are therefore successively supplied by the first order, second order, third order, etc., neighbors since all addresses are known to the controlling base station.

Figure 1:
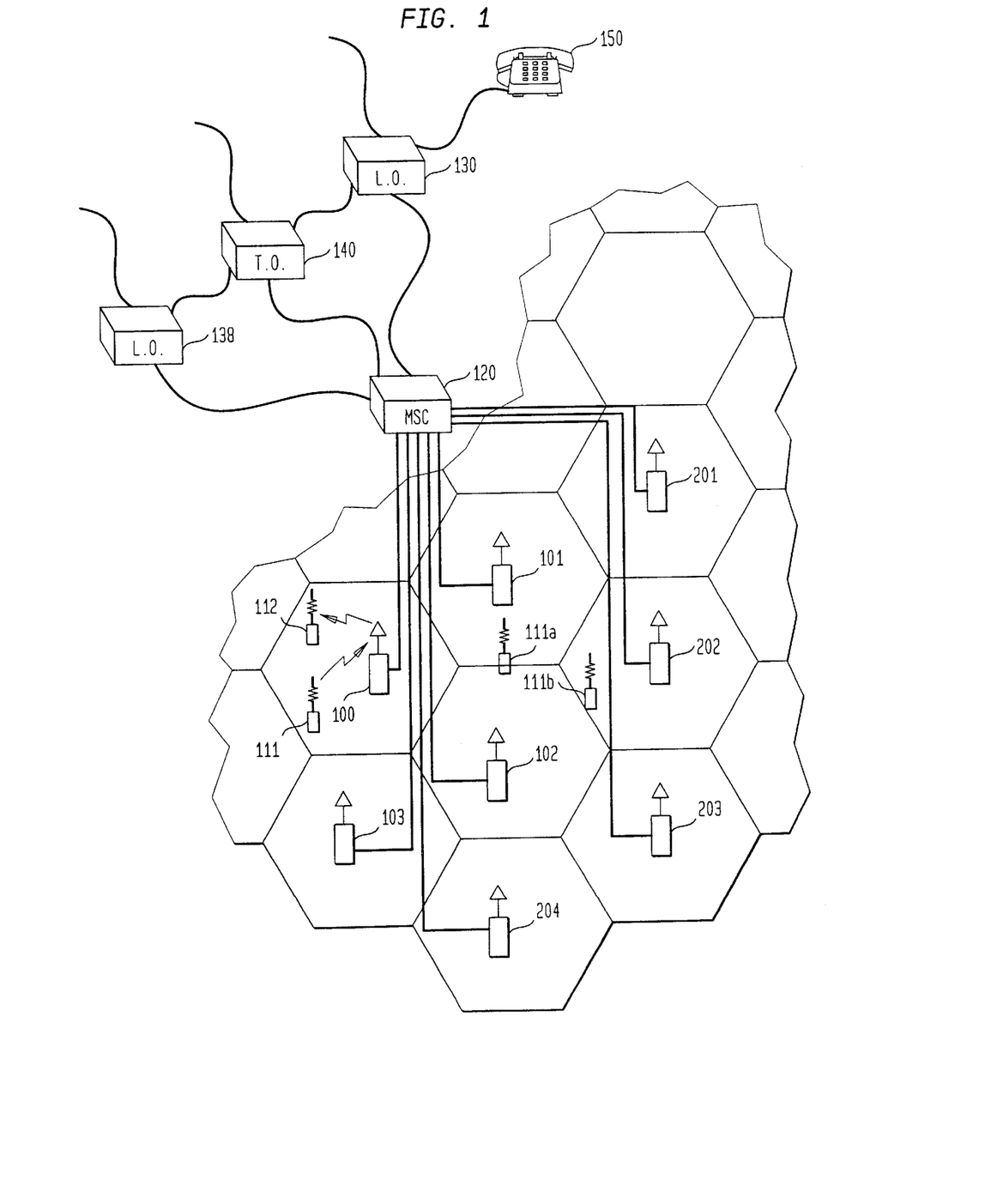
FIG. 1 illustrates an exemplary embodiment of a wireless communications system according to the present application.

FIG. 1 illustrates an exemplary wireless communications system according to the present invention operating in conjunction with an external communications system. The example in FIG. 1, in particular, illustrates the interconnection between portions of a wireless or cellular system and a publicly-switched telephone network (PSTN), including local and long-distance telephone networks. The wireless communications system includes a first ring of a plurality of geographically-dispersed base stations 101, 102, and 103 surrounding or neighboring a primary base station 100; and second ring of a plurality of geographically-dispersed base stations 201, 202, 203, and 204 surrounding or neighboring the base stations neighboring the primary base station 100, each of which provide radio communication services to wireless subscriber terminals, including first and second wireless terminals 111 and 112 (mobile or wireless unit such as a cellular phone, for example). Note that the base station 100, as will be described later, is the primary base station in the current example due to the existence of wireless terminals 111, and 112 within its cell. The base stations 100, 101, 102, 103, 201, 202, 203 and 204 are each operably connected to a wireless switching center 120. The wireless switching center 120 is operably connected to the land-based telecommunications network through the first and second local offices 130 and 138 respectively, and a toll office 140. The local offices 130 and 138 are known subsystems operable to provide switching and call processing functions in a local telephone network. The toll office 140, among other things, provides an operable connection to a long distance network, not shown.

For purposes of illustration, consider a call that includes the provision of a communication link between a first subscriber using the first wireless terminal 111, such as a cellular telephone, and a second subscriber using a telephone 150. Although the example given herein discusses a telephone call, the present invention may suitably be used in conjunction with a call involving a wireless communication system to accomplish the electronic communication of information in any form, including but not limited to analog oral communications, digital ASCII data, and analog and digital video and/or audio data in any suitable format.

During the call between the first subscriber and second subscriber, the first wireless terminal 111 and the base station 100 communicate over a radio channel, said radio channel defined in part by one of a plurality of available radio frequency pairs. To this end, the first wireless terminal 111 and the base station 100 each include radios operable to communicate over the radio channel. The base station 100 in turn converts the radio communication signals to digital communication signals, which are communicated to the switching center 120. The switching center 120 then communicates the digital communication signals in modified format to the appropriate local office, which may suitably be the local office 130. The local office under the control of the PSTN network, or a portion thereof, translates the signals into suitable form for transmission to the telephone 150.

If the first subscriber (and the first wireless terminal 111) significantly changes position with respect to the base stations 100 and 101, as shown by 111a, the base station 100 may determine that it is necessary to execute a soft handoff whereby the base station 101 begins servicing the call. If so, then the base station controls execution of the handoff. If for some reason, such as lack of available radio resources, base station 101 cannot accept the call and base station 100 cannot hold the call, base station 100 must be able to choose a suitable base station to communicate with and handoff directly to that other base station, such as base station 102.

From base station 102, the mobile station may further move into the area supported by base station 202 as is indicated by 111b in FIG. 1. To allow base station 202 to support the call via soft handoff, controlling base station 100 must be able to signal to base station 202, and therefore must know the signaling address for base station 202, or must be informed of that signaling address by base station 102.

To execute a handoff according to the present invention, the base station selects a handoff candidate base station, or simply a handoff candidate, from its $n^{th}$ order neighbor base stations based upon criteria such as the signal strength and quality. Neighbor base stations are typically defined as base stations having geographical coverage areas that border or overlap the referenced base station. For example, base stations 101, 102, and 103 are neighbor base stations with respect to base station 100 and base stations 201, 202, 203, and 204, while not being a neighbor of base station 100, are neighbors of neighbors, i.e., $2^{nd}$ order neighbors, of base station 100. Other suitable definitions of neighbor base stations exist, although such definitions generally imply relative proximity between the referenced base station and the neighbor base station. In this exemplary operation, the base station 101 is a neighbor base station with respect to the base station 100 and is selected as the primary handoff candidate when wireless terminal 111 moves into its cell region.

After completion of the handoff procedure, both the base station 100 and the base station 101 service the call contemporaneously. As a result the switching center 120 receives call signals associated with the call from each of the base stations 100 and 101. The switching center 120 then selects the call signals from the base station having the better quality signal and communicates those signals to the local office 130. It is apparent from such operation that while several base stations may at some point in time service the call and thus provide a portion of the communications link between the first subscriber and the second subscriber, the land-based telecommunications network receives only one signal and thus is not aware of how many base stations are providing service.

A detailed description of the hardware of base stations 100, 101, 102, and MSC 120, etc. will not be given herein as such is known to those of ordinary skill in the art. An exemplary description of each can be found in U.S. Pat. No. 5,794,149 for example.

Figure 2:
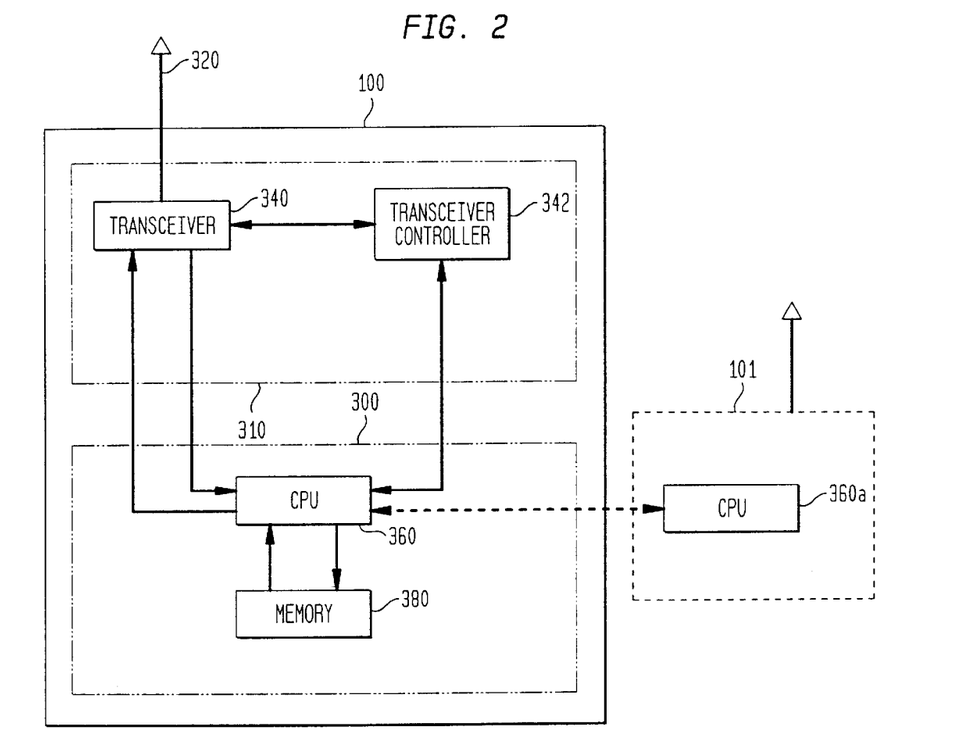
FIG. 2 illustrates the structure of a base station controller.

FIG. 2 illustrates the basic construction of a base station controller 300 for controlling a base station 100. The base station 100 typically includes an antenna 320 for receiving and sending signals to and from the wireless terminal, for example. Further, the base station controller 300 may be located at or remote from base station 100.

The base station controller includes a transceiver 340 for receiving signals from and transmitting signals to antenna 320. The transceiver 340 is connected to a processor such as a CPU 360 for example, which is in turn connected to memory 380. The CPU 360 is further connected to a CPU 360a of a neighboring base station 101, for example. Once identity and address of nth order neighbors is known, a similar direct connection can be established between CPU 360 and the CPU of the nth order neighbors. The transceiver 340 is also connected to a transceiver controller 342 for purposes of control of transceiver activities. Transceiver controller 342 is connected to the exemplary CPU 360 for purposes of coordination of transceiver activities either directly or via transceiver 340. The transceiver controller 342 and transceiver 340 make up a base transceiver station (BTS) 310. The base station controller 300 acts to receive (and potentially store in memory 380) information including identity and addresses of first, second, third, . . . , nth order neighboring base stations, to receive (and potentially store) signal quality measurements of neighboring base stations, and to establish direct connections with nth order neighbors using the received identity and address information to initiate handoffs to the nth order neighbors.

Figure 3:
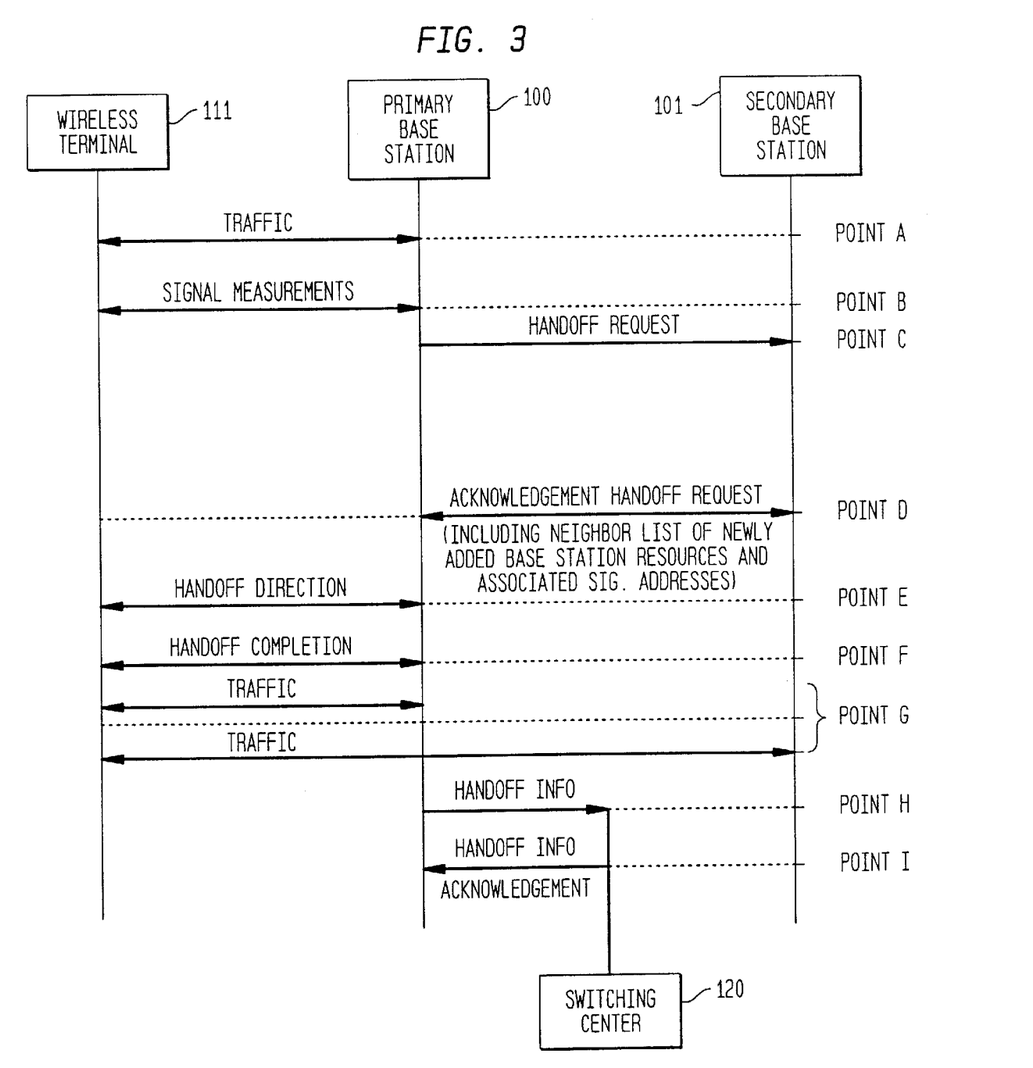
FIG. 3 illustrates a signal flow diagram of control signals transmitted between various components of the exemplary wireless network of FIG. 1 during the performance of an exemplary handoff procedure.

FIG. 3 illustrates a signal flow diagram of the control signals transmitted among the various components of the wireless network illustrated in FIG. 1, including the control signals transmitted in the course of a soft handoff procedure according to the present invention. The exemplary soft handoff procedure described in connection with the timing diagram of FIG. 3 involves the base station 100 (referred to as the primary base station), the base station 101 (referred to as the secondary base station), the wireless terminal 111, and the switching center 120, all from FIG. 1. In general, the soft handoff procedure starts in a state in which the primary base station 100 is servicing a call, and then changes to a state in which both the primary base station 100 and the secondary base station 101 service the call.

At point A, the primary base station 100 is actively servicing a call involving the wireless terminal 111. It is to be noted that point A does not indicate the transmission of a control signal but rather indicates an ongoing state. At point B, the wireless terminal 111 transmits a signal reporting the signal quality measurements of the neighboring base stations (a neighbor list) to the primary base station 100. To this end, the wireless terminal 111 from time to time during the call measures the strengths of beacon signals, known as pilot channels, of the neighboring base stations. The pilot channel strengths are then transmitted to the primary base station 100.

Between points B and C, the primary base station may select a handoff candidate if it appears that a handoff would be advantageous; If circumstances warrant a handoff, then the primary base station 100 selects an appropriate handoff candidate using, among other things, the signal quality measurements. The primary base station 100 thus selects the neighboring base station with the best signal quality measurement and contacts the base station directly (without contacting the switching center 120). In the exemplary procedure illustrated in FIG. 3, it is assumed that the primary base station 100 selects the secondary base station 101 as the most appropriate handoff candidate using this criteria.

As a result, at point C, the primary base station 100 sends a request signal directly to the secondary base station 101, requesting a soft handoff to the secondary base station 101. This request indicates the resources being requested as well as information for the secondary base station 101 to connect those resources to the same point as the resources currently being used to support the call and to choose the best transmission from those received from the mobile station 111 by the various base stations that may be supporting the call at any point in time.

The secondary base station 101 then, at point D, sends a soft handoff acknowledgement signal to the primary base station 100 acknowledging the handoff request. This soft handoff acknowledgment contains, among other information, the identities of neighbors of the base stations resources belonging to secondary base station 101 and the identity and signaling addresses for each of those neighbors (second, third, nth order neighbors). Thereafter, at point E, the primary base station 100 sends a soft handoff signal directing the wireless terminal 111 to begin communicating with the secondary base station 101. Once the wireless terminal 111 and the secondary base station begin communicating at point F, the wireless terminal 111 sends a message to the primary base station 100 advising that the handoff has been completed. At point G, communication traffic flows between the wireless terminal 111 and both the primary base station 100 and the secondary base station 101, or in other words, both base stations are servicing the call. Then, at point H, the primary base station 100 provides a handoff information signal to the switching center 120, which includes information identifying the secondary base station 101 as being involved in the handoff. Thereafter, at point I, the switching center 120 sends an update signal, which may be part of a handoff information acknowledgement signal, to the primary base station 100.

Each base station is provisioned or stored with the neighbor information for its own cells. Further, it is also provisioned with neighbor information for immediately adjacent cells belonging to other base station controllers. It is when the mobile station moves to an area outside the provisioned neighbor list, that knowledge of the identity of the controlling base stations and the signaling address of such additional base stations need be provided and used.

The procedure described in FIG. 3 applies directly to the situation of the addition of an nth order neighboring base station in soft handoff. Once the primary base station 100 becomes aware of the identity and signaling address of a neighboring base station through the information passed at point D in FIG. 3, primary base station 100 can use that information to establish a direct connection with the nth order neighboring base station (CPU 360 to CPU 360 of the nth order neighbor) and to communicate with that nth order neighboring base station to add it to the call in soft handoff.

Figure 4A:
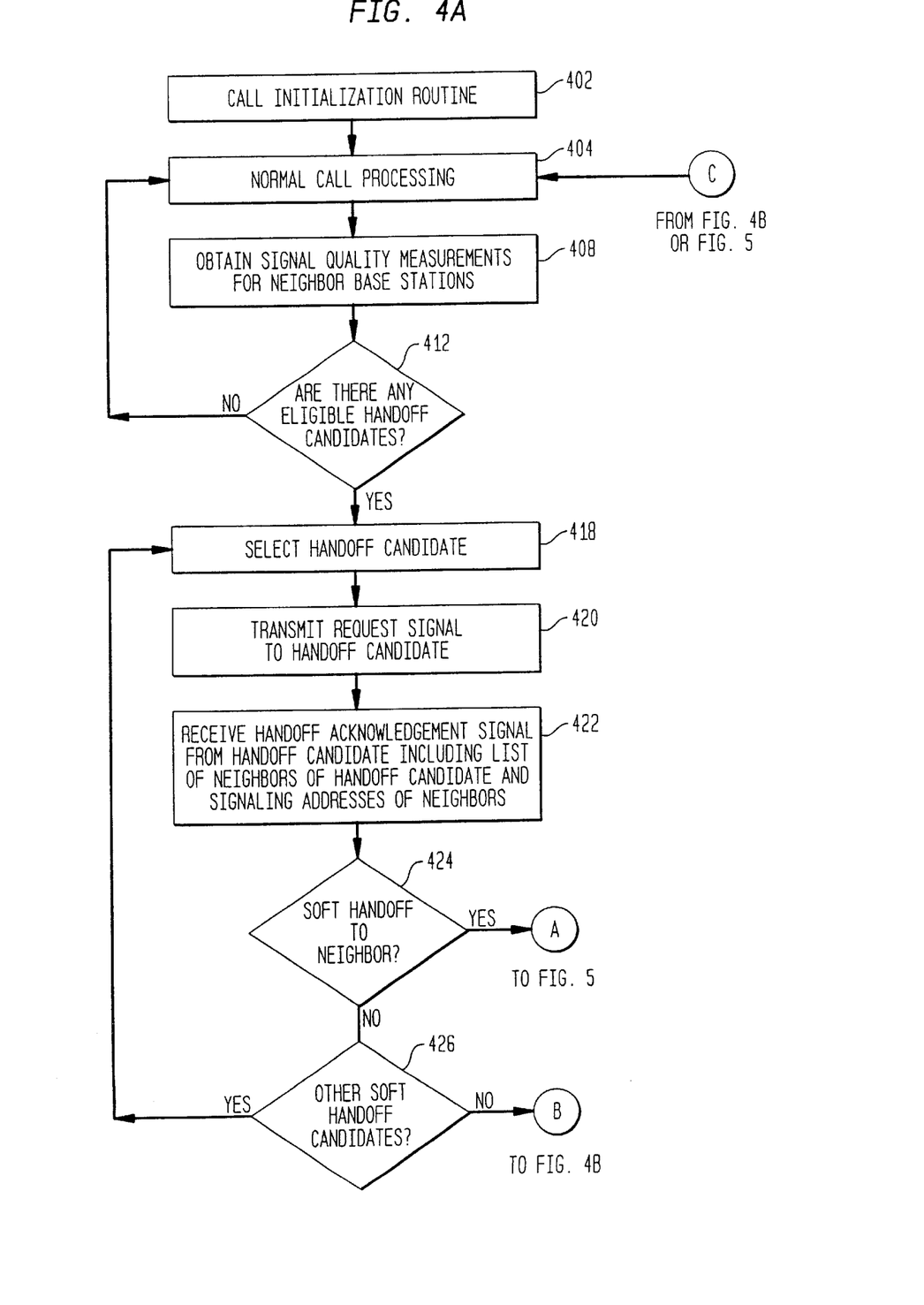
FIG. 4a illustrates an exemplary set of operations executed by a controller of a primary base station.

FIG. 4*a* illustrates in further detail an exemplary set of operations executed by a base station controller operating in accordance with the present invention. The base station controller supervises the operation of a primary base station (such as base station 100) servicing a call. The flow diagram of FIG. 4*a* shows an overview of the supervisory functions of the primary base station controller, or simply primary controller, with respect to the call. It will be noted that an actual primary controller will typically supervise several such calls contemporaneously.

The important point to note during the following discussion of FIG. 4*a* is that the exemplary procedure described in that flow diagram applies equally well to direct neighbor base stations of a primary controlling base station (primary controller) and to all nth order neighbor base stations of the primary controller. This advantage is derived directly from the invention because once the identity and signaling address of an nth order neighbor base station are provided to the primary controller (at point D in FIG. 3), the primary controller can establish a direct connection with the nth order neighboring base station (CPU 360 to CPU 360) and can signal to that base station in the same way that it signals to a direct neighbor base station.

The signaling address of a base station controller used for this purpose is an address that allows the primary controller to establish a direct CPU to CPU link and send signaling information to the candidate base station controller. For exemplary purposes, such a signaling address may be a TCP/IP address, that is, an address consisting of a Transport Control Protocol (TCP) component and an Internet Protocol (IP) component.

When the subscriber at the wireless terminal either initiates a call transaction or is paged (or called), the primary controller, in step 402, performs a call initialization routine which effectively sets up the communication link between the subscriber and another party. An example of an initialization routine is illustrated in U.S. Pat. No. 5,794,149.

In step 404, the primary controller supervises ordinary call processing routines as is known in the art. As a part of the call processing, the primary controller periodically measures the signal quality from the wireless terminal. If signal quality diminishes below a certain point, the call may be terminated or a handoff may be forced, as is known in the art.

In addition, during call processing, the primary controller obtains from the wireless terminal, signal quality measurements for many and typically all of the neighboring base stations, as is illustrated in step 408. The wireless terminal typically obtains such signal quality information by measuring the signal strength of the neighbor base station pilot channels. The signal quality of a neighboring base station is approximated or derived from the measured pilot channel strength, using methods which are well-known in the art.

The provision of the neighbor base station signal quality measurements to the primary controller may occur either periodically or upon occurrence of an event. For example, the wireless terminal may provide the current signal quality measurements of the neighboring base stations when one or more pilot channel measurements exceeds or falls below a predetermined threshold. In the alternative, however, the wireless terminal may simply from time to time provide the pilot signal strength measurements to the primary controller, which in turn temporarily stores the values. In either case, in step 408, the primary controller obtains relatively current neighbor signal quality measurements. The primary controller thereafter proceeds to step 412.

In step 412, the primary controller determines whether there are any eligible handoff candidates. The eligible handoff candidate determination is based on a number of factors may include the neighbor base station signal quality measurements, and the number and signal quality of base stations currently servicing the call. Those of ordinary skill in the art may readily determine other methods of identifying eligible handoff candidates. Such additional identification methods may involve, for example, knowledge of geographic locations of base stations reported by the mobile station and their proximity to base stations whose signals were not reported by the mobile station to the primary controller. The pilot signals reported by the mobile station are correlated by the primary controller to neighboring base stations. Such neighboring base station information may have been provisioned into the primary controller, or may have been obtained by the primary controller from other base stations during soft handoff procedures such as that referred to in step 422, for example. If there are no eligible handoff candidates, then the primary controller continues to service the call and returns to step 404.

If, however, in step 412, it is determined that there is at least one eligible handoff candidate, then the primary controller in step 418 selects a handoff candidate from the eligible handoff candidates, which may suitably be the eligible handoff candidate having the best signal quality measurement. It should be noted that the set of eligible handoff candidates includes nth order neighboring base stations with no loss of generality of the exemplary procedure of FIG. 4*a*. Since the procedure is the same once the identity and addresses of the nth order neighbor base station is known, further description is omitted for the sake of brevity.

Thereafter, in step 420, which corresponds to point C of FIG. 3, the primary controller transmits a request signal directly to the handoff candidate base station. The signaling address used to access the candidate base station is either known to the primary controller through provisioning or was obtained at step 422, in a previous soft handoff procedure.

If the candidate base station acknowledges and approves the handoff, then the controller receives a handoff acknowledgement signal from the handoff candidate in step 422, which includes information identifying the handoff type as either a soft handoff or a semisoft handoff. A detailed explanation of the differences between soft handoffs and semisoft handoffs is provided further in U.S. Pat. No. 5,794,149. In general, however, a soft handoff is a handoff in which the handoff candidate is added to service the call and the primary base station also continues to service the call. A semisoft handoff, on the other hand, usually requires that the primary base station discontinue servicing or drop the call upon completion of the handoff. The determination of whether a soft handoff or a semisoft handoff is executed is discussed in U.S. Pat. No. 5,794,149. In any event, if the handoff type is soft, then in step 424, the primary controller proceeds to step 502 of FIG. 5 to execute the soft handoff. If, however, it is determined that the handoff cannot be made in step 424, a decision is made at 426 whether there are additional soft handoff candidates. With regard to nth order neighbors, once identity and address information is received, the primary base station controller can request that the wireless terminal obtain signal quality measurements for the nth order base stations in the same manner as previously described in step 408 of FIG. 4a. Thus, nth order neighbors can be chosen as soft handoff candidates and a direct link (CPU 360 to CPU 360) can be established. If there are additional soft handoff candidates, the primary controller returns to step 418. If there are no more soft handoff candidates, the primary controller proceeds to FIG. 4b. Further description will be omitted for the sake of brevity.

Figure 4B:
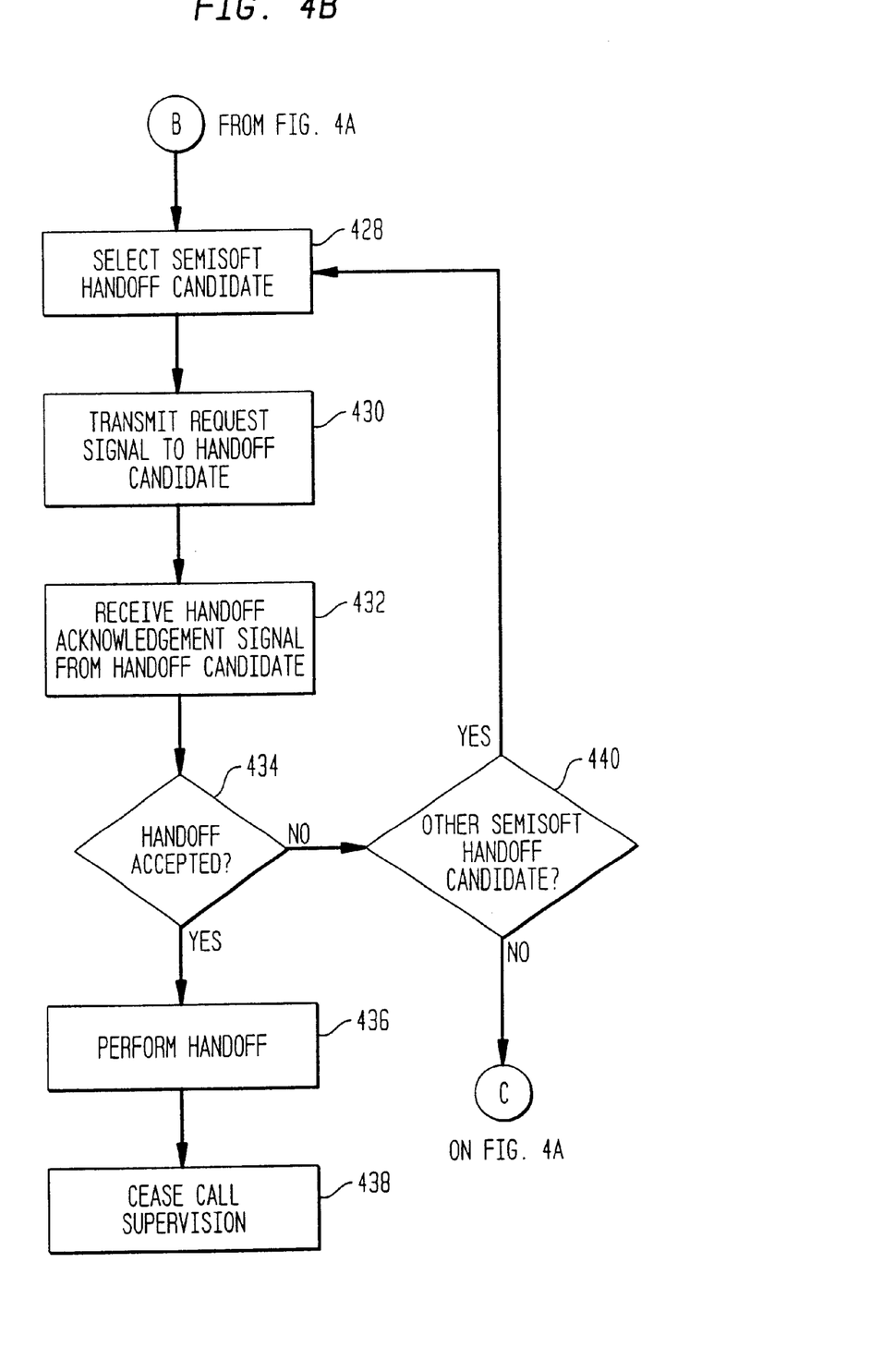
FIG. 4b illustrates further operations executed by a controller of a primary base station.

FIG. 4b illustrates a routine at the primary base station controller for determining handoff candidates for semi-soft handoff using base station identity and address information received. It should be noted that the set of eligible semi-soft handoff candidates may include nth order neighboring base stations with no loss of generality of the exemplary procedure of FIG. 4b.

In step 428 of FIG. 4b, a semi-soft handoff candidate is selected from the list of eligible neighbors. In step 430 of FIG. 4b, a direct link (CPU to CPU) is established and is contacted directly by the primary base station controller. This is possible because the primary controller knew the identity and signaling address of the candidate base station either as a direct neighbor, or through receipt of the identity and signaling address of an nth order neighbor in step 422 during a previous soft handoff procedure. The candidate base station responds in step 432 concerning its availability for participation in the semi-soft handoff. Thus, a handoff acknowledgement signal is received from the handoff candidate in step 432. At step 434, if the handoff is accepted, the primary controller proceeds to step 436 to perform the handoff and then cease supervision of the call at step 438. If at step 434, the handoff was not accepted by the candidate base station, the primary controller determines at step 440 whether other semi-soft handoff candidates exist. If such other candidates exist, the primary controller proceeds to step 428. If not, the primary controller proceeds to point C on FIG. 4a to continue normal call processing.

Figure 5:
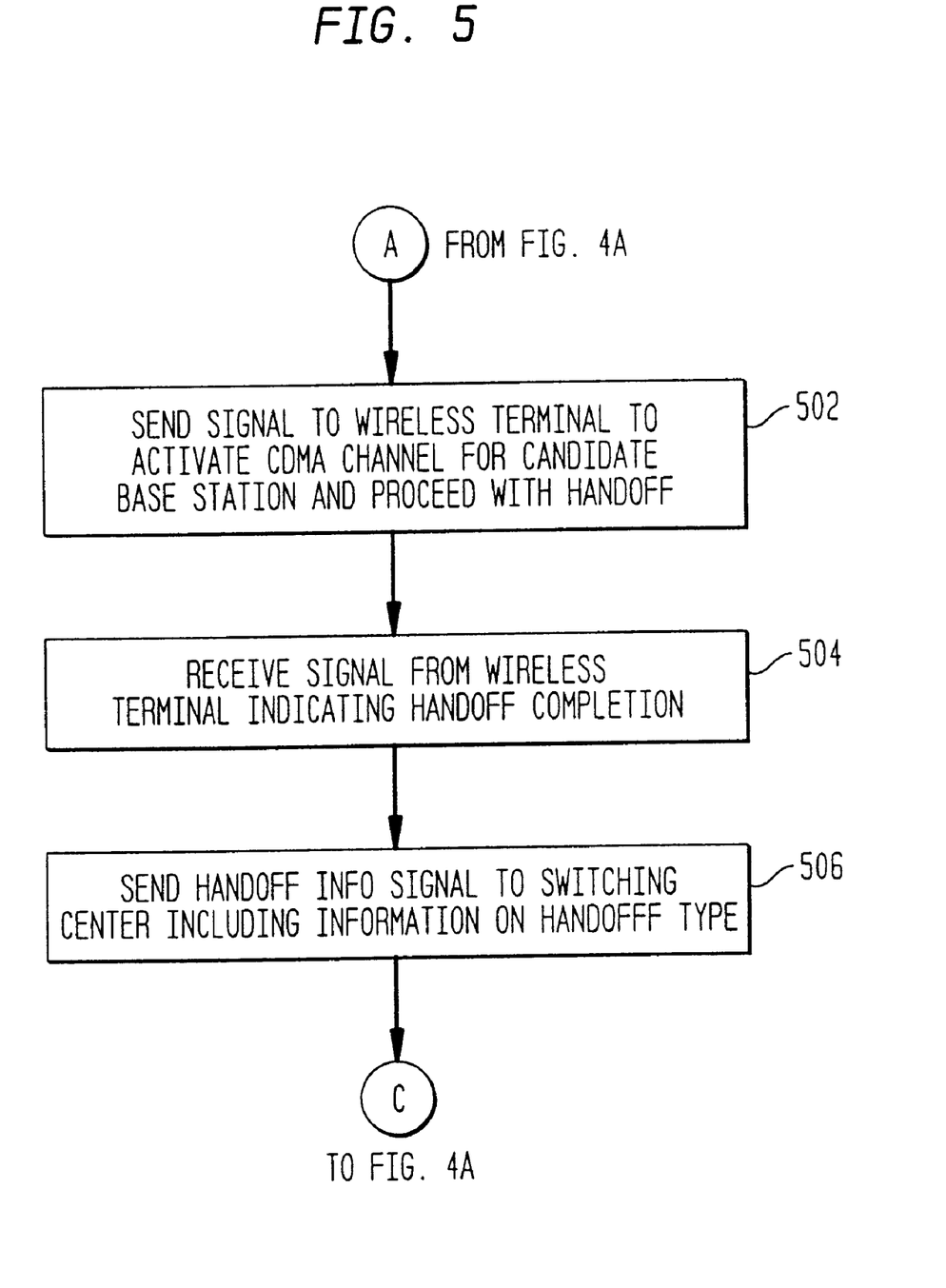
FIG. 5 illustrates an exemplary set of operations executed by a controller for a primary base station during the course of a soft handoff procedure according to the present invention.

FIG. 5 illustrates an exemplary flow diagram of the operations executed by the primary controller after the handoff candidate has acknowledged that a soft handoff may occur in step 422 of FIG. 4a. In step 502, the primary controller transmits a soft handoff signal to the wireless terminal advising the wireless terminal to activate a CDMA radio channel for communicating with the handoff candidate. Once the wireless terminal activates the CDMA radio channel and begins communicating with the handoff candidate, the wireless terminal transmits a signal which is received by the primary controller in step 504 advising that the handoff has been completed steps 502 and 504 correspond to points E and F, respectively, of FIG. 2.

Once the soft handoff is completed, the primary controller in step 506 transmits an information signal to the switching center. Step 506 corresponds to point H of FIG. 2. The information signal identifies the handoff type (soft, semisoft, etc.), the reason for the handoff, and information identifying the newly added handoff candidate, which is thereafter referred to as the secondary base station. Once the soft handoff is complete, the primary controller returns to step 404 and continues call processing.

The invention being thus described, it will be obvious that this same may be varied in many ways. Such variations are not to be regarded as a departure from the spirit and scope of the invention, and all such modifications as will be obvious to one skilled in the art are intended to be included within the scope of the following claims.

What is claimed is:

1. A base station controller, associated with a primary base station, for wireless signal communication directly between base stations, comprising:

a processor, adapted to initiate direct contact with a neighboring base station in preparation of wireless communication signal handoff from the primary base station, the processor being further adapted to output a signal contacting the neighboring base station and to receive information from the contacted neighboring base station, including address information of second order neighbors; and a memory, adapted to store received information, including address information of the second order neighbors, the processor thereafter being adapted to initiate a handoff of the wireless communication signal directly from the primary base station to a selected neighboring base station, among the second order neighbors, using the received information.

2. The base station controller of claim 1, wherein the processor is further adapted to receive signal quality measurements for neighboring base stations and second order neighbors and the processor is adapted to selected an acceptable one of the neighboring base stations and second order neighbors and initiate handoff of the wireless communication signal from the primary base station to the selected base station based on the received signal quality measurements.

3. The base station controller of claim 2, wherein the wireless communication signal is a wireless communication call of a wireless unit being handled by the primary base station.

4. The base station controller of claim 3, wherein the received signal quality measurements are measurements of the quality of the wireless communication call at the neighboring base stations and the second order neighbors.

5. The base station controller of claim 1, wherein the processor is further adapted to receive signal quality measurements for neighboring base stations and the processor is adapted to initiate contact with a neighboring base station based on the received signal quality measurements.

6. The base station controller of claim 5, wherein the processor is further adapted to receive signal quality measurements for second order neighbors upon the processor determining that no neighboring base station is acceptable for handoff of the wireless communication signal and wherein the processor is adapted to select an acceptable one of the second order neighbors and initiate handoff of the wireless communication signal from the primary base station to the selected second order neighbor based on the received signal quality measurements.

7. The base station controller of claim 6, wherein the processor is further adapted to receive signal quality measurement for third order neighbors upon the processor determining that no second order neighbor is acceptable for handoff for the wireless communication signal and wherein the processor is adapted to select an acceptable one of the third order neighbors and initiate handoff of the wireless communication signal from the primary base station to the selected third order neighbor based on the received signal quality measurements.

8. The base station controller of claim 7, wherein the wireless communication signal is a wireless communication call of a wireless unit being handled by the primary base station.

9. The base station controller of claim 8, wherein the received signal quality measurements are measurements of the quality of the wireless communication call at the neighboring base stations and the third order neighbors.

10. The base station controller of claim 6, wherein the wireless communication signal is a wireless communication call of a wireless unit being handled by the primary base station.

11. The base station controller of claim 10, wherein the received signal quality measurements are measurements of the quality of the wireless communication call at the neighboring base stations and the second order neighbors.

12. The base station controller of claim 5, wherein the wireless communication signal is a wireless communication call of a wireless unit being handled by the primary base station.

13. The base station controller of claim 12, wherein the received signal quality measurements are measurements of the quality of the wireless communication call at the neighboring base stations.

14. The base station controller of claim 1, wherein the wireless communication signal is a wireless communication call of a wireless unit being handled by the primary base station.

15. The base station controller of claim 1, wherein the processor is further adapted to receive information including address information of third order neighbors.

16. The base station controller of claim 15, wherein the processor is adapted to initiate handoff of the wireless communication signal directly from the primary base station to a selected one of the neighboring base station, the second order neighbors and the third order neighbors, using the received information.

17. The base station controller of claim 15, further comprising:
a memory, adapted to store received information, including address information of the second order neighbors and of the third order neighbors.

18. The base station controller of claim 17, wherein the processor is adapted to initiate handoff of the wireless communication signal directly from the primary base station to a selected one of the neighboring base station, the second order neighbors and the third order neighbors, using the received information.

19. The base station controller of claim 1, wherein the handoff performed is a semi-soft handoff.

20. The base station controller of claim 1, wherein the handoff performed is a soft handoff.

21. A method of wireless signal communication directly between base stations in a wireless network comprising:
contacting a neighboring base station directly in preparation of wireless communication signal handoff from a primary base station;
receiving information at the primary base station from the contacted neighboring base station, including identity and address information of second order neighbors; and
performing a handoff of the wireless communication signal directly from the primary base station to a selected neighboring base station, including the neighboring base station and the second order neighbors, using the received information.

22. The method of claim 1, further comprising the step of:
receiving signal quality measurements for neighboring base stations and second order neighbors at the primary base station, and
selecting an acceptable one of the neighboring base stations and second order neighbors for handing off of the wireless communication signal based on the received signal quality measurements.

23. The method of claim 22, wherein the wireless communication signal is a wireless communication call of a wireless unit being handled by the primary base station.

24. The method of claim 23, wherein the received signal quality measurements are measurements of the quality of the wireless communication call at the neighboring base stations and the second order neighbors.

25. The method of claim 1, further comprising the steps of:
receiving signal quality measurements for neighboring base stations at the primary base station; and
contacting a neighboring base station directly based on the received signal quality measurements.

26. The method of claim 25, further comprising the steps of:
receiving signal quality measurements for second order neighbors at the primary base station, upon determining that no neighboring base station is acceptable for handing off of the wireless communication signal; and
selecting an acceptable one of the second order neighbors for handing off of the wireless communication signal based on the received signal quality measurements.

27. The method of claim 26, further comprising the steps of:
receiving signal quality measurements for third order neighbors at the primary base station, upon determining that no second order neighbor is acceptable for handing off of the wireless communication signal; and
selecting an acceptable one of the third order neighbors for handing off of the wireless communication signal based on the received signal quality measurements.

28. The method of claim 27, wherein the wireless communication signal is a wireless communication call of a wireless unit being handled by the primary base station.

29. The method of claim 28, wherein the received signal quality measurements are measurements of the quality of the wireless communication call at the neighboring base stations and the third order neighbors.

30. The method of claim 26, wherein the wireless communication signal is a wireless communication call of a wireless unit being handled by the primary base station.

31. The method of claim 30, wherein the received signal quality measurements are measurements of the quality of the wireless communication call at the neighboring base stations and the second order neighbors.

32. The method of claim 25, wherein the wireless communication signal is a wireless communication call of a wireless unit being handled by the primary base station.

33. The method of claim 32, wherein the received signal quality measurements are measurements of the quality of the wireless communication call at the neighboring base stations.

34. The method of claim 1, wherein the wireless communication signal is a wireless communication call of a wireless unit being handled by the primary base station.

35. The method of claim 1, wherein the information received includes address information of third order neighbors.

36. The method of claim 35, wherein the wireless communication signal is handed off directly from the primary base station to a selected one of the neighboring base stations, the second order neighbors and the third order neighbors, using the received information.

37. The method of claim 1, wherein the handoff performed is a semi-soft handoff.

38. The method of claim 1, wherein the handoff performed is a soft handoff.

\* \* \* \* \*